(12) United States Patent
Mielke et al.

(10) Patent No.: US 6,909,898 B2
(45) Date of Patent: Jun. 21, 2005

(54) METHOD AND APPARATUS FOR UPDATING A MOBILE UNIT

(75) Inventors: Mark P. Mielke, Wood Dale, IL (US); Steven D. Tucker, Villa Park, IL (US); Arthur R. Hennessey, Naperville, IL (US)

(73) Assignee: Verizon Airfone Inc., Oak Brook, IL (US)

( * ) Notice: Subject to any disclaimer, the term of this patent is extended or adjusted under 35 U.S.C. 154(b) by 421 days.

(21) Appl. No.: 10/096,165

(22) Filed: Mar. 12, 2002

(65) Prior Publication Data

US 2002/0090946 A1 Jul. 11, 2002

Related U.S. Application Data

(63) Continuation of application No. 08/988,457, filed on Dec. 10, 1997, now Pat. No. 6,799,037.
(60) Provisional application No. 60/033,069, filed on Dec. 12, 1996.

(51) Int. Cl.[7] .................................................. H04Q 7/20
(52) U.S. Cl. ..................... 455/435.1; 455/419; 455/524
(58) Field of Search ........................... 455/435.1, 435.2, 455/435.3, 433, 466, 418, 419, 420, 517

(56) References Cited

U.S. PATENT DOCUMENTS

| | | | |
|---|---|---|---|
| 5,109,403 A | 4/1992 | Sutphin | 379/59 |
| 5,414,762 A | 5/1995 | Flisik et al. | 379/198 |
| 5,442,553 A | 8/1995 | Parrillo | 364/424.04 |
| 5,490,203 A | 2/1996 | Jain et al. | 455/435 |
| 5,519,761 A | 5/1996 | Gilhousen | 455/431 |
| 5,546,444 A | 8/1996 | Roach, Jr. et al. | 379/59 |
| 5,559,865 A | 9/1996 | Gilhousen | 455/435 X |
| 5,651,050 A | 7/1997 | Bhagat et al. | 455/431 |
| 5,805,683 A | 9/1998 | Berberich, Jr. | 455/431 X |
| 5,832,380 A | 11/1998 | Ray et al. | 455/431 |
| 5,862,475 A | 1/1999 | Zicker et al. | 455/419 |
| 5,873,036 A | 2/1999 | Vucetic | 455/431 X |
| 5,875,405 A | 2/1999 | Honda | 455/418 X |
| 5,884,170 A * | 3/1999 | Valentine et al. | 455/433 |
| 5,956,639 A | 9/1999 | Armbruster et al. | 455/431 |
| 6,014,429 A | 1/2000 | LaPorta. | 455/38.1 X |

FOREIGN PATENT DOCUMENTS

| | | | | |
|---|---|---|---|---|
| GB | 0 260 763 | 3/1988 | | H04Q/7/04 |
| WO | WO 95/03666 | 2/1995 | | H04M/1/00 |

* cited by examiner

*Primary Examiner*—Nay Maung
*Assistant Examiner*—Philip J. Sobutka
(74) *Attorney, Agent, or Firm*—Leonard C. Suchtya, Esq.; Joel Wall, Esq.; Finnegan, Henderson, Farabow et al

(57) ABSTRACT

Mobile communication systems and methods consistent with the present invention include a central station, a mobile unit and a plurality of radio base stations The mobile unit communicates with the central station through one of the radio base stations. The central station receives from the mobile unit registration information identifying the radio base station the mobile unit is currently communicating with. This registration information is then stored in a registration database located at the central station. Files are then transferred from the central station to the mobile unit using the radio base station identified by the registration information stored in the registration database.

2 Claims, 5 Drawing Sheets

METHOD AND APPARATUS FOR UPDATING A MOBILE UNIT

CROSS-REFERENCE TO RELATED APPLICATIONS

The present application is a continuation of U.S. application Ser. No. 08/988,457, filed Dec. 10, 1997, now U.S. Pat. No. 6,799,037, which claims priority of U.S. Provisional Application No. 60/033,069, filed Dec. 12, 1996.

BACKGROUND OF THE INVENTION

A. Field of the Invention

The present invention relates to methods and systems for updating a wireless unit. More particularly, the present invention relates to methods and systems for simultaneously updating a plurality of wireless units.

B. Description of the Related Art

Wireless communication systems, such as mobile telecommunication systems or air-to-ground systems, are well known and widely used. Many of these systems include wireless units having complex application software. Periodically, the software of these wireless units must be updated to reflect, more advanced versions of the software as they become available or changes in system parameters as determined by a system manager.

This updating process is particularly troublesome in an air-to-ground communication system. In such a system, the aircrafts include a variety of complex application software relating to various on-board communication and control units. Moreover, aircrafts typically have a variety of data which must be transferred to the ground stations on a periodic basis as well. Updating the application software of an aircraft can take an extensive amount of time. In addition, the updating is typically done for one aircraft at a time. Thus, for a large fleet of aircraft, the updating process is lengthy and expensive. An additional processing constraint with air-to-ground wireless communication systems is determining which specific radio base station is within the transmission range of the aircraft. This requirement necessitates that the ground station know the particular location of the aircraft at any given time, thereby presenting prohibitive mapping requirements. Therefore, there is a need for a wireless communication system which can update a large number of wireless units in an efficient manner.

SUMMARY OF THE INVENTION

Systems and methods consistent with the present invention allow data files to be efficiently transferred between a ground switching station and a plurality of wireless units.

To achieve these and other advantages, wireless communication systems and methods consistent with the present invention include a central station, a mobile unit and a plurality of radio base stations. The central station receives from the mobile unit registration information identifying the radio base station currently in communication with the wireless unit. This registration information is then stored in a registration database located at the central station. Files are then transferred from the central station to the mobile unit using the radio base station identified by the registration information stored in the registration database.

Both the foregoing general description and the following Detailed Description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention.

In the drawings.

DETAILED DESCRIPTION

A. Overview

Systems and methods consistent with the present invention allow data files to be efficiently transferred between a ground switching station and a plurality of mobile wireless units. Each mobile unit communicates with the ground switching station through a network of radio base stations. The actual radio base station with which each mobile unit is communicating changes as the wireless unit moves from one location to the next.

To receive data from the ground switching station, each mobile unit registers with the ground switching station to provide information as to which radio base station the mobile unit is currently communicating. This information is collected to form a registration database for each registered mobile unit. Prior to a file transfer, the registration database is used to determine which radio base station must be used to transfer files to the mobile unit.

B. System Organization

Figure 1:
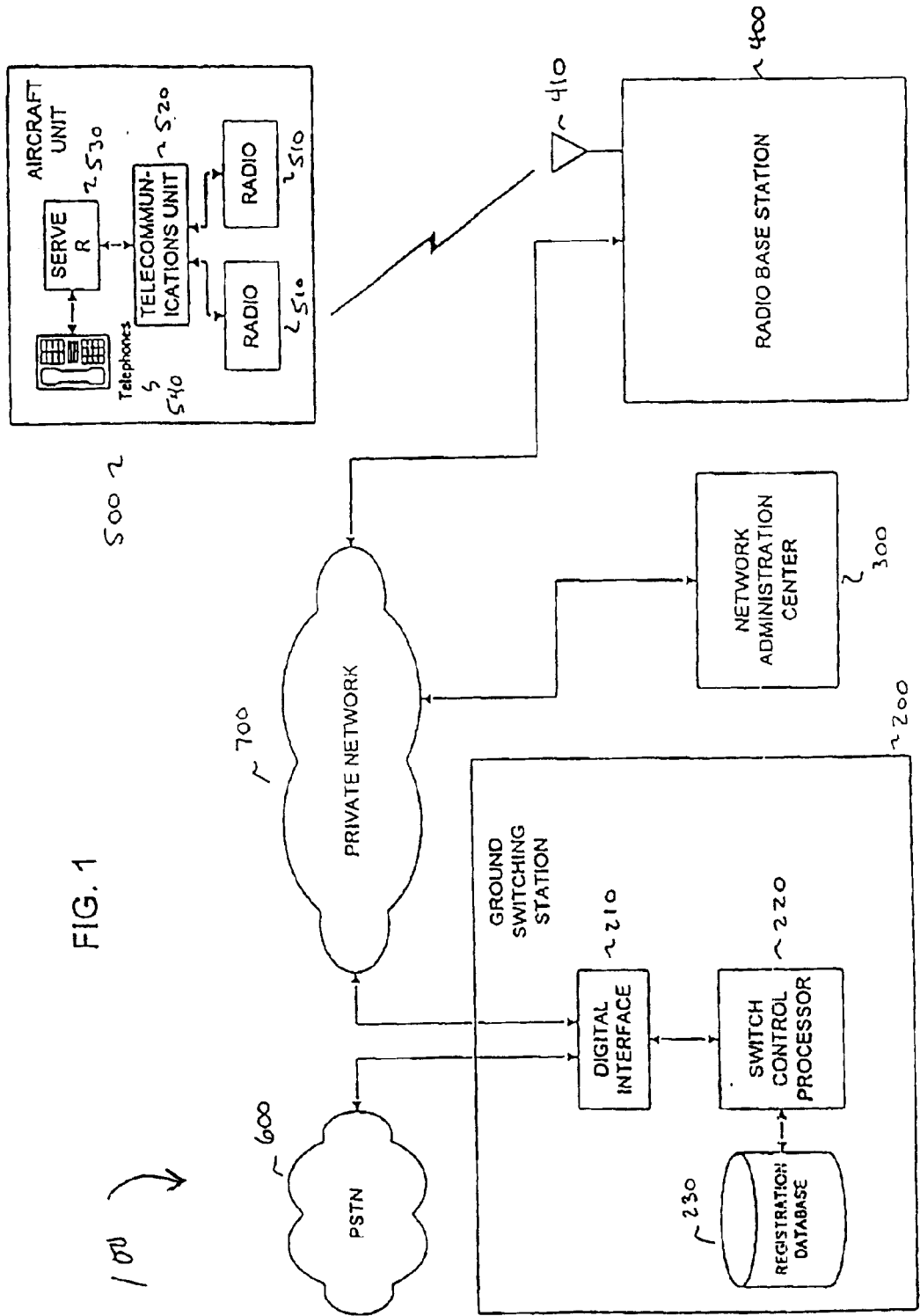
FIG. 1 is a block diagram of a wireless communication system consistent with the present invention.

FIG. 1 is a block diagram of a wireless communication system 100 consistent with the present invention. While FIG. 1 shows system 100 implemented in an air-to-ground communication system, the present invention may be used within any mobile wireless communication system servicing one or more mobile units. To utilize the systems and methods of the present invention, these mobile units need only an on-board server or controller with the ability to communicate with a base server system.

As shown in FIG. 1, system 100 includes a ground switching station 200, a network administration center 300, a radio base station 400, an aircraft unit 500, public switched telephone network (PSTN) 600, and a private network 700. Ground switching station 200 further includes a digital interface 210, a switch control processor (SCP) 220, and a registration database 230. Aircraft unit 500 further includes radios 510, a telecommunication unit 520, an on-board server 530, and telephones 540 Although aircraft unit 500 is preferably located on a commercial airliner, any mobile device having a radio communication device and appropriate radio communication control application software for transmitting and receiving data may be used with system 100.

Ground switching station 200, network administration center 300 and radio base station 400 are each coupled to one another through private network 700. Aircraft unit 500 can, therefore, communicate with either ground switching station 200 or network administration center 300 via radio base station 400 and private network 700. While FIG. 1 shows only one aircraft unit 500 and one corresponding base station 400, system 100 preferably comprises a network of radio base stations 400 servicing multiple aircrafts flying in numerous locations. In such a case, system 100 may further include a plurality of ground switching stations 200, each servicing a geographic subset of the network of radio base stations 400. Ground switching station 200 is also coupled to PSTN 600 such that it can switch data signals from base station 400 to PSTN 600 and vice versa.

Digital interface 210 of ground switching station 200 provides an interface that converts data received from radio base station 400 into a framing or protocol format compatible with SCP 220. Preferably, data received over private network 700 from radio base station 500 operates at a transport rate of 4.8 Kb/s while SCP 220 operates at a transport rate of 64 Kb/s. SCP 220 is a file storage and distribution server for storing and distributing files, including data and/or programming, to aircraft unit 500 Files stored by SCP 220 are preferably used to update aircraft application software on-board aircraft unit 500. Registration database 230 is coupled to SCP 220 and stores information on aircraft unit 500. This information is provided by aircraft unit 500 during a registration process (described below) and is used during subsequent file transfers to aircraft unit 500.

Each radio base station 400 is coupled to an antenna 410 that receives and radiates broadcast signals. Preferably, antenna 410 is identical to typical cell site antennas that are well known to those skilled in the art. Broadcast signals radiated from radio base station 400 form a cell through which aircraft unit 500 passes. Radio base station 400 communicates with aircraft unit 500 over a plurality of channels selected by radios 510.

Each radio 510 of aircraft unit 500 comprises two transceivers and, therefore, can communicate with radio base station 400 over two channels. Broadcast signaling data received by radios 510 are converted to baseband and relayed to a telecommunication unit 520 via an E-1 link. Once the broadcast data has been received, telecommunication unit 520 then routes the received data to the appropriate destination on-board aircraft unit 500. The destination address is preferably determined according to control information transmitted from SCP 220, via radio base station 400, to telecommunication unit 520 in a message following the broadcast data. Depending upon the type of data received from radio base station 400, the destination may be either radios 510, telecommunication unit 520, on-board server 530 or telephones 540.

On-board server 530 is similar to a local area network server and performs management functions associated with telephones 540. On-board server 530 distributes to telephones 540 data signals received from telecommunication unit 530. On-board server 530 also manages the power consumed by telephones 540. It should be understood that aircraft unit 500 may have a single telephone, as in the case of a small aircraft, or multiple telephones, as when part of a commercial airliner. When aircraft unit 500 is located on a commercial airliner, at least two on-board servers 530 are provided, such that each server 530 controls a corresponding set of telephones 540. For example, each server 530 may control telephones 540 located on a corresponding side of the center isle of the aircraft.

System 100 also allows for aircraft unit 500 to transmit data to the ground. Telecommunication unit 520 relays the data to radios 510 which then communicate the data to radio base station 400. From there, the data can be transferred to either ground switching station 200, network administration center 300 or PSTN 600. Data transmitted by aircraft unit 500 may be of differing types. For example, aircraft unit 500 can transmit information relating to its on-board telecommunications. This type of information may include billing records, fault logs, or information relating to call volume. Aircraft unit 500 may also transmit control information relating to the status of the components of aircraft unit 500 as it pertains to communication. Finally, aircraft unit 500 transmits telephone calls to PSTN 600 placed by users of telephones 540.

C. Registration of Aircraft Units

In systems consistent with the present invention, aircraft units 500 register with ground switching station 200. The registration information is used to track each registered aircraft unit 500 as it passes through the plurality of radio base stations 400. In this way, ground switching station 200 knows at any one time which radio base station 400 is in communication with each aircraft unit 500. Aircraft units 500 preferably register each time the radio base station 400 it is communicating with changes.

Figure 2:
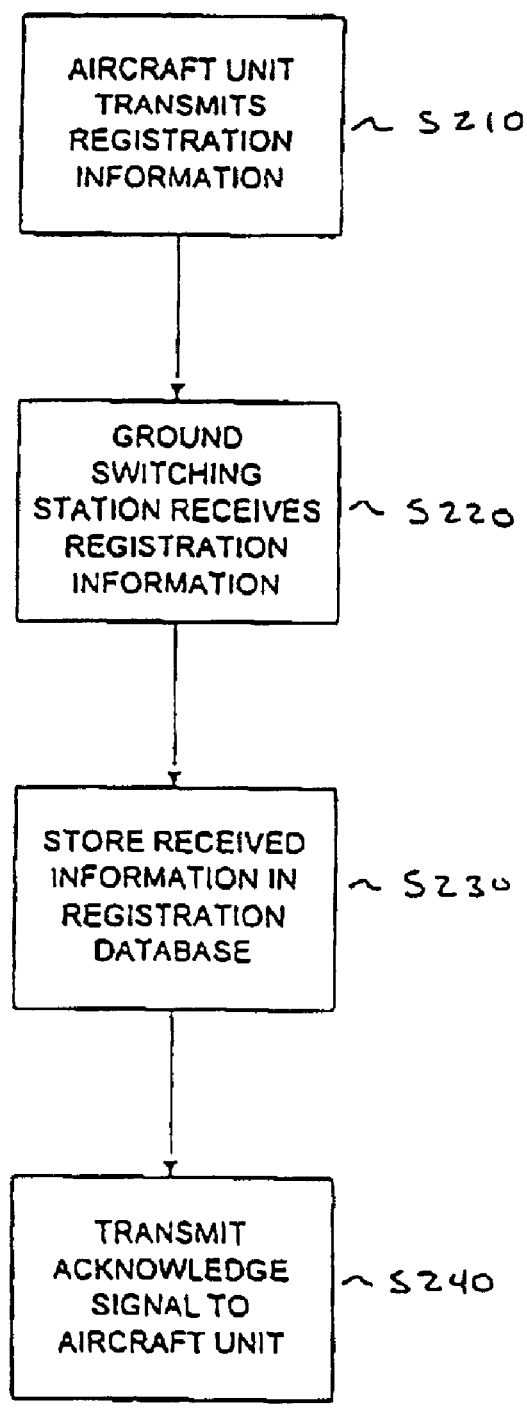
FIG. 2 is a flow diagram showing a method for registering aircraft units with a ground switching station.

FIG. 2 is a flow diagram showing a method for registering aircraft units 500 with ground switching station 200. As shown in FIG. 2, each aircraft unit 500 transmits registration information to ground switching station 200 (step S210). The registration information preferably includes an identification number identifying the particular aircraft unit 500 that is registering, the radio base station 400 currently in communication with the aircraft unit 500, and the radio base station 400 previously in communication with the aircraft unit 500. The aircraft identification number is preferably the International Civil Aviation Organization (ICAO) identification number presently assigned to each aircraft. SCP 220 at ground switching station 200 receives the registration information from each aircraft unit 500, via radio base station 400, and organizes it into a format for storage in registration database 230 (steps S220 and S230).

Once the registration information has been received, SCP 220 transmits an acknowledgment signal back to aircraft unit 500, via radio base station 400, to verify that the registration process was completed (step S240). Through the registration process, SCP 220 knows at any one time which aircraft units 500 are communicating with system 100, radio base stations 400 currently communicating with each aircraft unit 500 and the location of aircraft units 500 in relation to these radio base stations 400.

D. File Transfer

Figure 3:
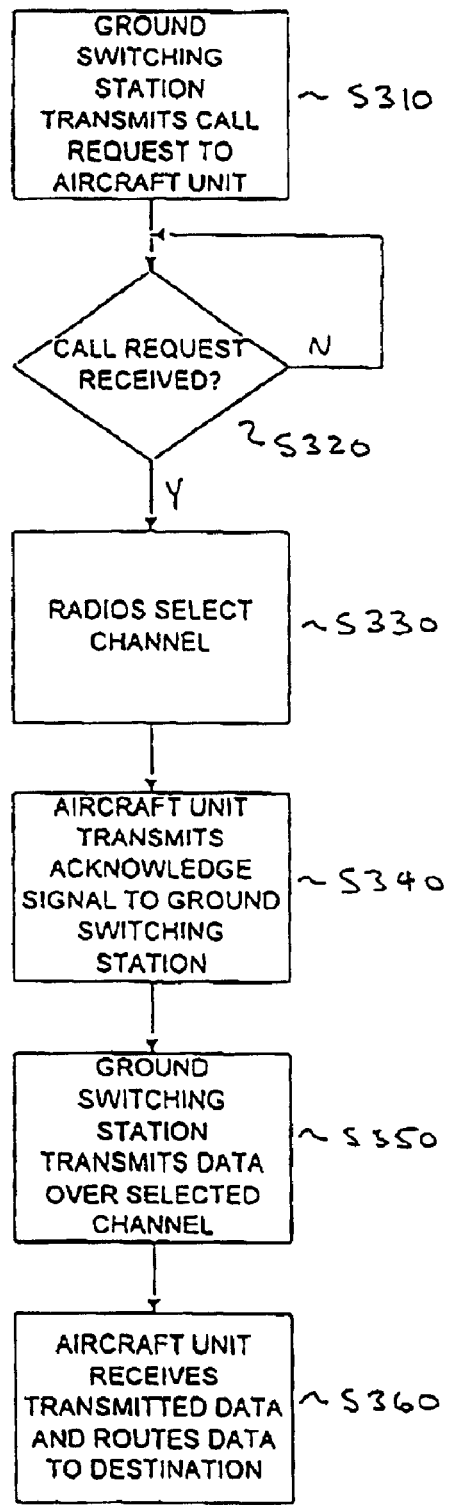
FIG. 3 is a flow diagram showing a method for transmitting data from the ground switching station to an aircraft unit.

FIG. 3 is a flow diagram showing a method for transmitting files from ground switching station 200 to aircraft unit 500. The transmitted files preferably stored in SCP 220 and, as described above, may be updates for application software loaded on aircraft unit 500. As shown in FIG. 3, ground switching station 200 initiates a transfer process by transmitting a call request over a control channel to aircraft 500 (step S310). The call request includes information identifying the file that ground switching station 200 is requesting to transfer, the size of the file, and the ICAO number of the particular aircraft unit 500. Before transmitting the call request, however, ground switching station 200 accesses registration database 230 to determine the radio base station 400 currently communicating with the particular aircraft unit 500. Ground switching station 200 then transmits the call request to that radio base station 400 via private network 700.

Radios 510 located on aircraft unit 500 continuously monitor for the transmission of a call request (step S320). When a call request is detected, radios 510 select one of the plurality of communication channels for the transmission of the broadcast (step S330). In systems 100 consistent with the present invention, radios 510 use channel selection algorithms well known to those of ordinary skill in the art to select the channel that best effectuates the transfer.

Aircraft unit 500 then transmits an acknowledgment signal, via radio base station 400, back to ground switching station 200 (step S340). The acknowledgment signal contains the ICAO number for the particular aircraft unit 500 and indicates whether aircraft unit 500 can receive the file. If the acknowledgment signal indicates aircraft unit 500 can receive the file, ground switching station 200 transmits the file over the selected channel (step S350). Radios 510 receive the broadcast and relay the information to telecommunications unit 520 which, in turn, determines the destination of the data. As described above, the address destination is preferably transmitted in message following the data transfer, but other forms of addressing may be used as well. When ground switching station 200 has finished the file transfer, telecommunications unit 520 then routes the data to its intended destination on aircraft unit 500 (step S360).

Figure 4:
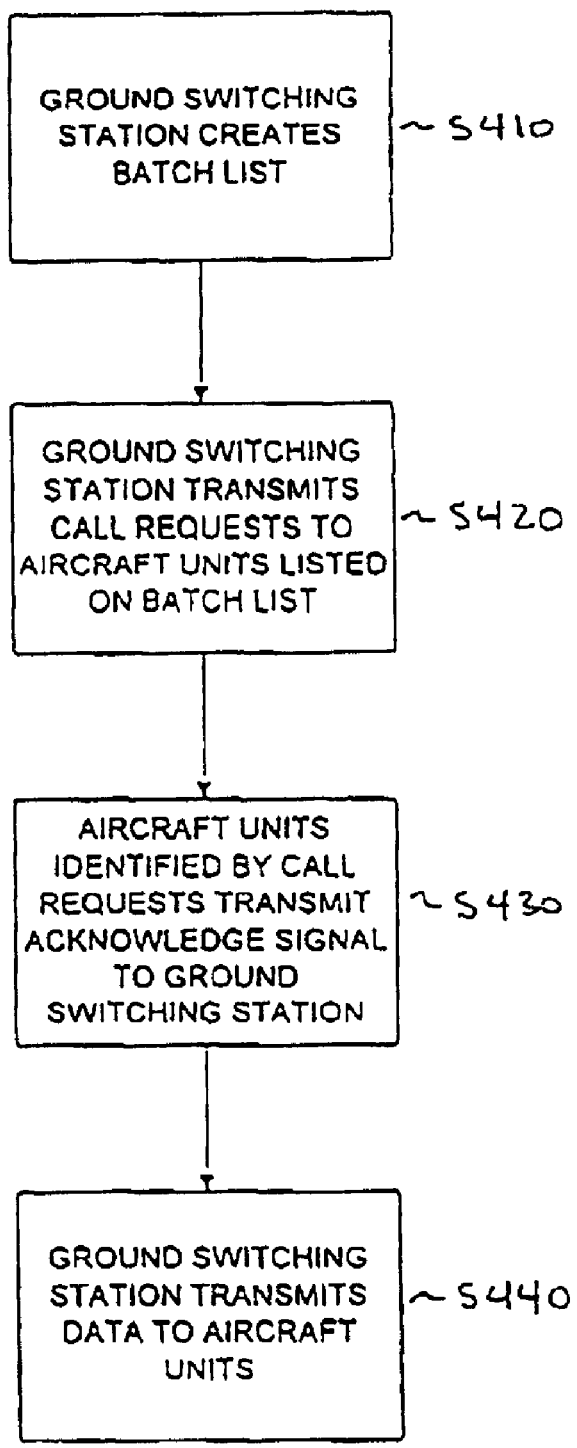
FIG. 4 is a flow diagram showing a batch process used to update the application software on-board a plurality of aircraft units.

Systems 100 consistent with the present invention can also transfer data to a plurality of aircraft units 500 simultaneously through a batch or "push" process. The plurality of aircraft units 500 may be all or a selected set of aircraft units 500 registered with system 100. FIG. 4 is a flow diagram showing a batch process used to update the application software on-board aircraft units 500. SCP 220 creates a list of aircraft units 500 which are to receive the transmitted file (step S410) and transmits a call request, via radio base station 400, to each aircraft unit 500 identified by the list (step S420). The transmitted call requests are similar to that of step S310, with the exception that each call request is modified to include the ICAO number of a corresponding aircraft unit 500 included in the batch file.

Although aircraft units 500 registered with system 100 and not listed on the batch file will receive the call request, only those aircraft units 500 identified by the ICAO numbers included with the call requests will respond. The responding aircraft units 500 then transmit an acknowledgment signal back to ground switching station 200 (step S430), which, in turn, will begin the transmission to aircraft unit 500 when the acknowledgment signal indicates that aircraft unit 500 can receive data (step S440). Telecommunications unit 520 then routes the received data to the appropriate destination on-board aircraft unit 500, in the manner described above. Through the batch process, system 100 can simultaneously update the application software on-board a multiple of aircraft units 500.

Figure 5:
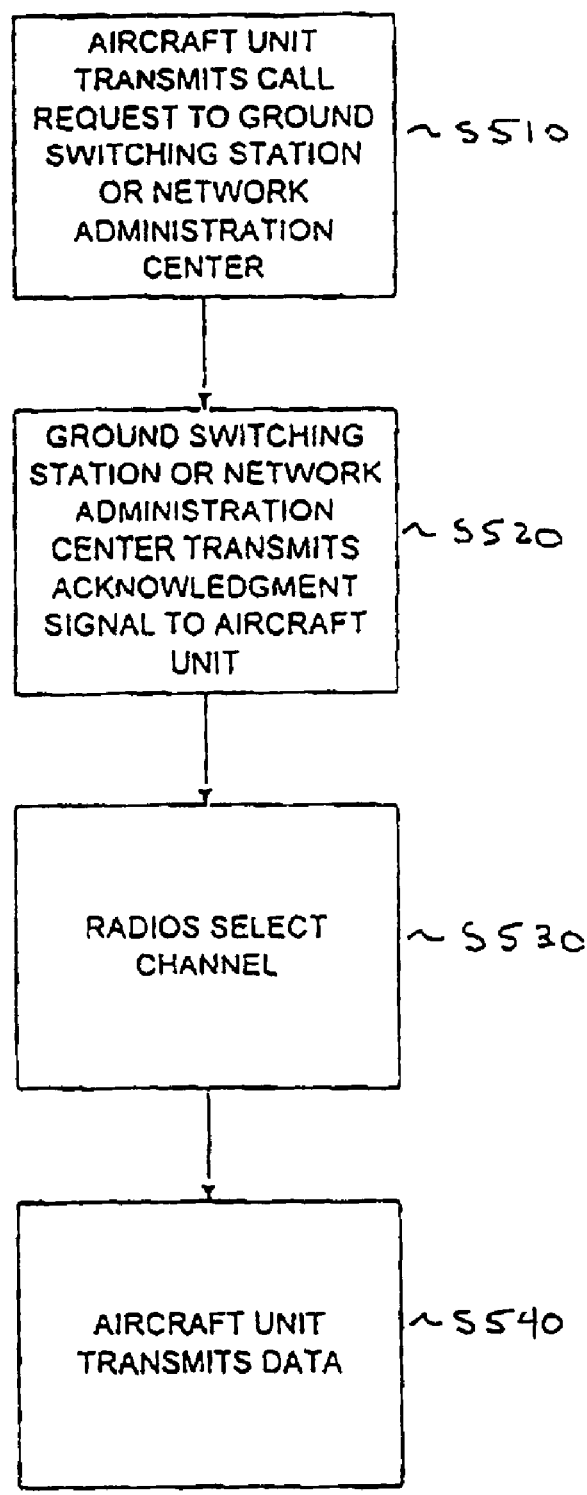
FIG. 5 illustrates the transmission process for transmitting data from the aircraft unit to either the ground switching station or the network administration center.

FIG. 5 illustrates the transmission process for transmitting files from aircraft unit 500 to either ground switching station 200 or network administration center 300. As described above, files transmitted from aircraft unit 500 may include billing records or fault logs of aircraft unit 500's communication system or diagnostic information relating to the on-board communication hardware. As shown in FIG. 5, telecommunications unit 520 initiates the data transfer by transmitting a call request, via the corresponding radio base station 400, to either ground switching station 200 or network administration center (step S510).

Ground switching station 200 or network administration center 300 will then transmit back to aircraft unit 500 an acknowledgment signal (step S520). Upon reception of the transmitted acknowledgment signal, radios 510 will select a communication channel, in the manner described above (step S530). Aircraft unit 500 then transmits over the selected channel the file to either ground switching station 200 or network administration center 300 (step S540). For files transferred to network administration center 300, the file will first be transmitted to ground switching station 200 which then switches the transmitted file to network administration center 300. Such files received by network administration center 300 may then be stored in network administration center 300 and indexed according to the ICAO numbers of the respective aircraft units 500.

1. Data Integrity Control

Systems 100 consistent with the present invention also provide for error correction of transmitted data. After each data transfer to aircraft unit 500, SCP 220 transmits to telecommunication unit 520 a "down load completed" message signifying that the data transfer is completed. SCP 220 then disconnects the communication link with telecommunication unit 520 and generates a status report for the previous data transfer. The status report includes information on whether the transfer was completed, and if not, information on what error occurred. In the latter case, system 100 re-attempts the data transfer at a later time. Since aircraft unit 500 may have passed to a new location corresponding to a radio base station 400 different from the one that was used during the previous file transfer, a different SCP 220 and a different radio base station 400 may be used during the second file transfer. In the event that multiple file transfer attempts are made, SCP 220 maintains in registration database 230 a record of the radio base station 400 used during the most recent successful data transmission attempted by SCP 220 for that aircraft unit 500.

Telecommunication unit 520 may also transmit an inventory message to network administration center 300. The inventory message provides status information on the updated application software of aircraft unit 500. The status information may then be used to determine whether the application software was correctly updated. If the application software was not correctly updated, ground switching station retransmits the data to aircraft unit 500.

Additional error correction methods may also be employed by system 100. For instance, SCP 220 may detect errors using the forward error correction (FEC) method or the cyclic redundancy checking (CRC) method, each of which are well known in the art. For CRC error correction, SCP 220 generates a correction number based on the data transmitted and transfers this number to telecommunication unit 520 which also generates a correction number according to the received data. According to whether these two correction numbers match each other, telecommunication unit 520 can determine whether an error has occurred.

Telecommunication unit 520 may also be provided with control circuitry for detecting power loss or loss of the radio signal during file transfer. In such a case, telecommunication unit 520 can request SCP 220 to retransmit the data not received due to the signal or power loss.

E. Conclusion

It will be apparent to those skilled in the art that various modifications and variations can be made to the system and method of the present invention without departing from the spirit or scope of the invention. The present invention covers the modifications and variations of this invention provided they come within the scope of the appended claims and their equivalents.

What is claimed is:

1. A method for transferring data in a communication system, the communication system comprising a central station, a plurality of mobile units, and a plurality of radio base stations, wherein the central station communicates with each of the plurality of mobile units, the method comprising:

receiving from each mobile unit registration information identifying a radio base station currently in communication with the mobile unit;

storing the registration information in a registration database located at the central station, such that the registration database stores information identifying the particular radio base station currently communicating with each of the plurality of mobile units;

receiving a request to transfer data to a selected group of the plurality of mobile units;

transferring data from the central station to the selected group of mobile units using the radio base stations identified by the registration information stored in the registration database for each mobile unit in the selected group, and wherein the transferring step further includes:

transmitting to a particular mobile unit a call request identifying data that the central station requests to transfer;

receiving an acknowledgment signal from the particular mobile unit indicating whether the particular mobile unit can receive the requested data; and transferring the requested data to the mobile particular unit when the acknowledgment signal indicates that the particular mobile unit can receive the requested data.

2. A mobile communication system comprising:

a plurality of mobile units for receiving and transmitting broadcast signals, each mobile unit having at least one server operatively coupled to a plurality of telephones;

a plurality of radio base stations for transmitting and receiving broadcast signals to and from the plurality of mobile units;

a central station for communicating with each mobile unit through one of the radio base stations, the central station further including:

a registration database including registration information identifying the radio base station currently in communication with each mobile unit; and a switch control processor for transferring data to a selected group of the plurality of mobile units using the radio base stations identified by the registration information stored in the registration database for each mobile unit in the selected group, wherein the switch control processor further includes:

means for transmitting to a particular mobile unit a call request identifying data that the central station requests to transfer;

means for receiving from the particular mobile unit an acknowledgment signal indicating whether the particular mobile unit can receive the requested data; and means for transferring the requested data to the particular mobile unit when the acknowledgment signal indicates that the particular mobile unit can receive the requested data.

* * * * *